United States Patent [19]

Staras et al.

[11] 3,781,879
[45] Dec. 25, 1973

[54] HARMONIC RADAR DETECTING AND RANGING SYSTEM FOR AUTOMOTIVE VEHICLES

[75] Inventors: Harold Staras; Joshua Shefer, both of Princeton, N.J.

[73] Assignee: RCA Corporation, New York, N.Y.

[22] Filed: June 30, 1972

[21] Appl. No.: 267,947

[52] U.S. Cl. ............................ 343/5 R, 343/100 PE
[51] Int. Cl. ............................................. G01s 9/02
[58] Field of Search .................. 343/6.5 R, 6.5 LC, 343/6.8 R, 6.8 LC, 18 C, 100 PE, 5 R

[56] References Cited
UNITED STATES PATENTS

| | | | |
|---|---|---|---|
| 3,631,484 | 12/1971 | Augenblick | 343/6.5 R |
| 3,161,879 | 12/1964 | Hannan et al. | 343/18 R |
| 3,098,971 | 7/1963 | Richardson | 343/6.8 R X |
| 3,308,464 | 3/1967 | Lewis | 343/18 C |
| 3,079,557 | 2/1963 | Crabtree | 343/6.8 R X |

*Primary Examiner*—Malcolm F. Hubler
*Attorney*—Edward J. Norton

[57] ABSTRACT

In a vehicular harmonic radar detecting and ranging system, a transmitter transmits a highly directional and polarized beam of electromagnetic energy, preferably in the microwave spectrum, toward a passive target. The passive target reradiates a beam of energy, which is harmonically related to and polarized orthogonal to the transmitted beam, directionally back toward the transmitter. A receiver by being selectively responsive the the harmonically related and orthogonally polarized reradiated beam, is immune to blinding which would otherwise be caused by the transmitted signals of other radar equipped vehicles and to the clutter caused by extraneous targets.

11 Claims, 7 Drawing Figures

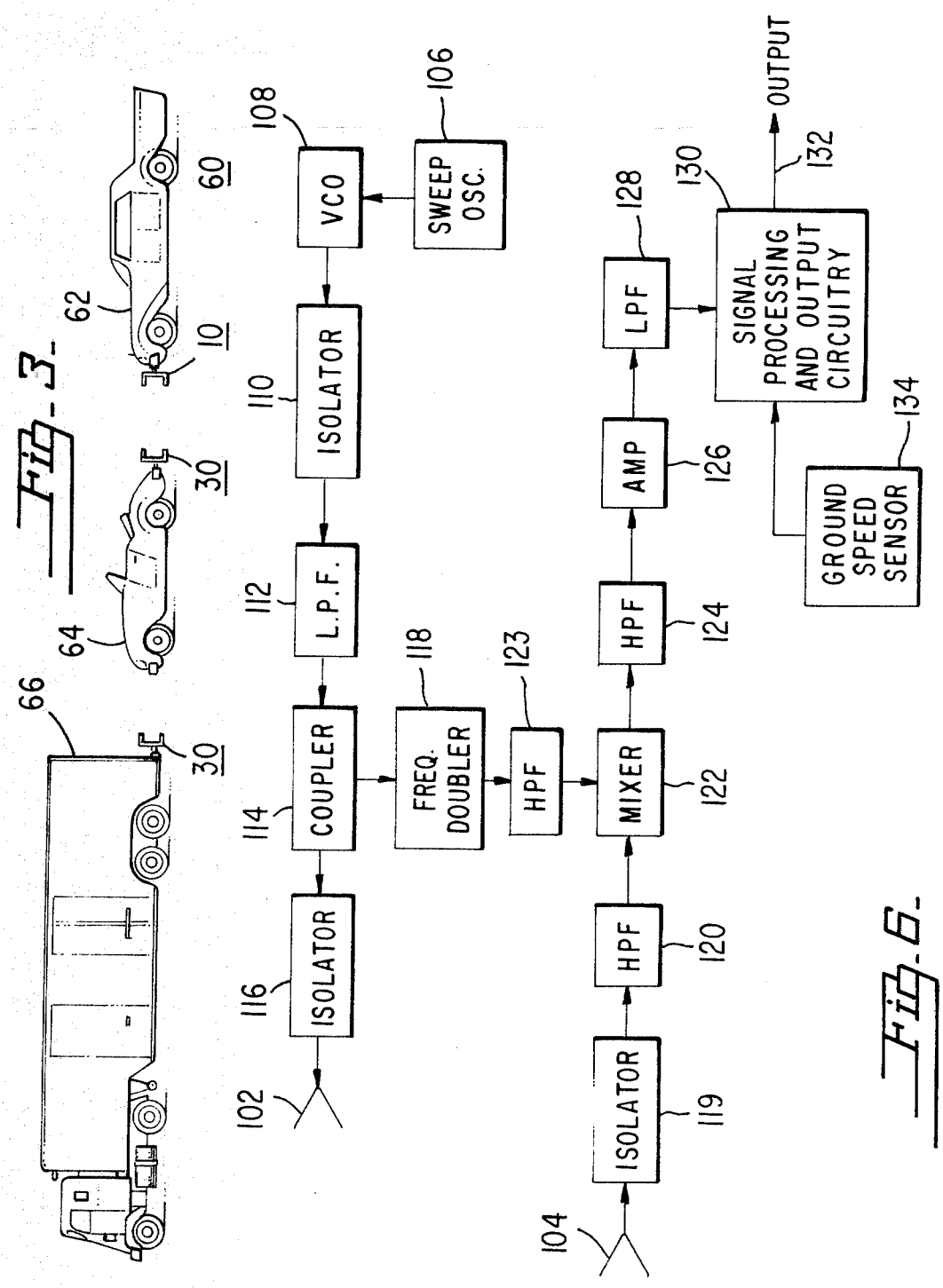

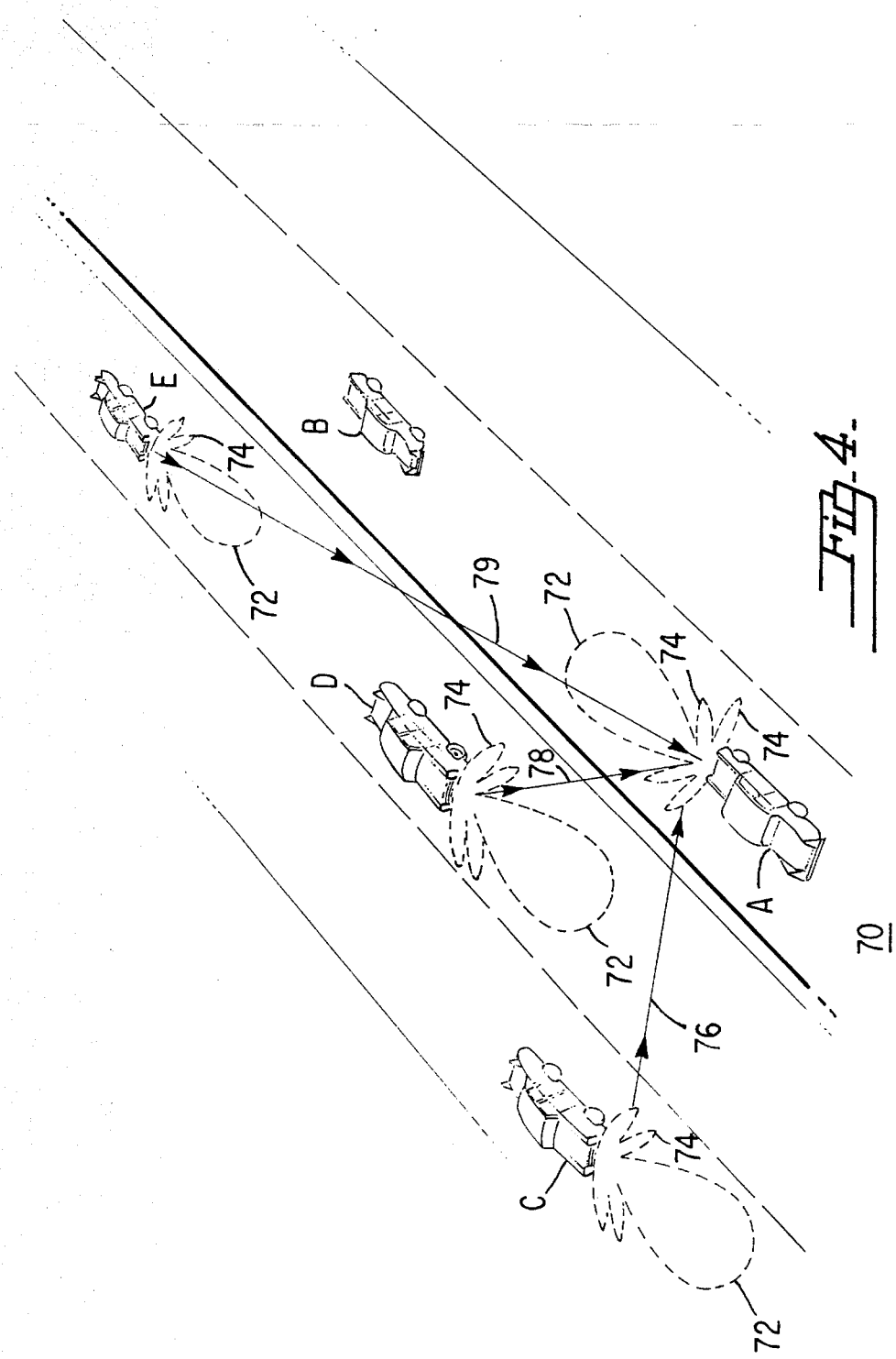

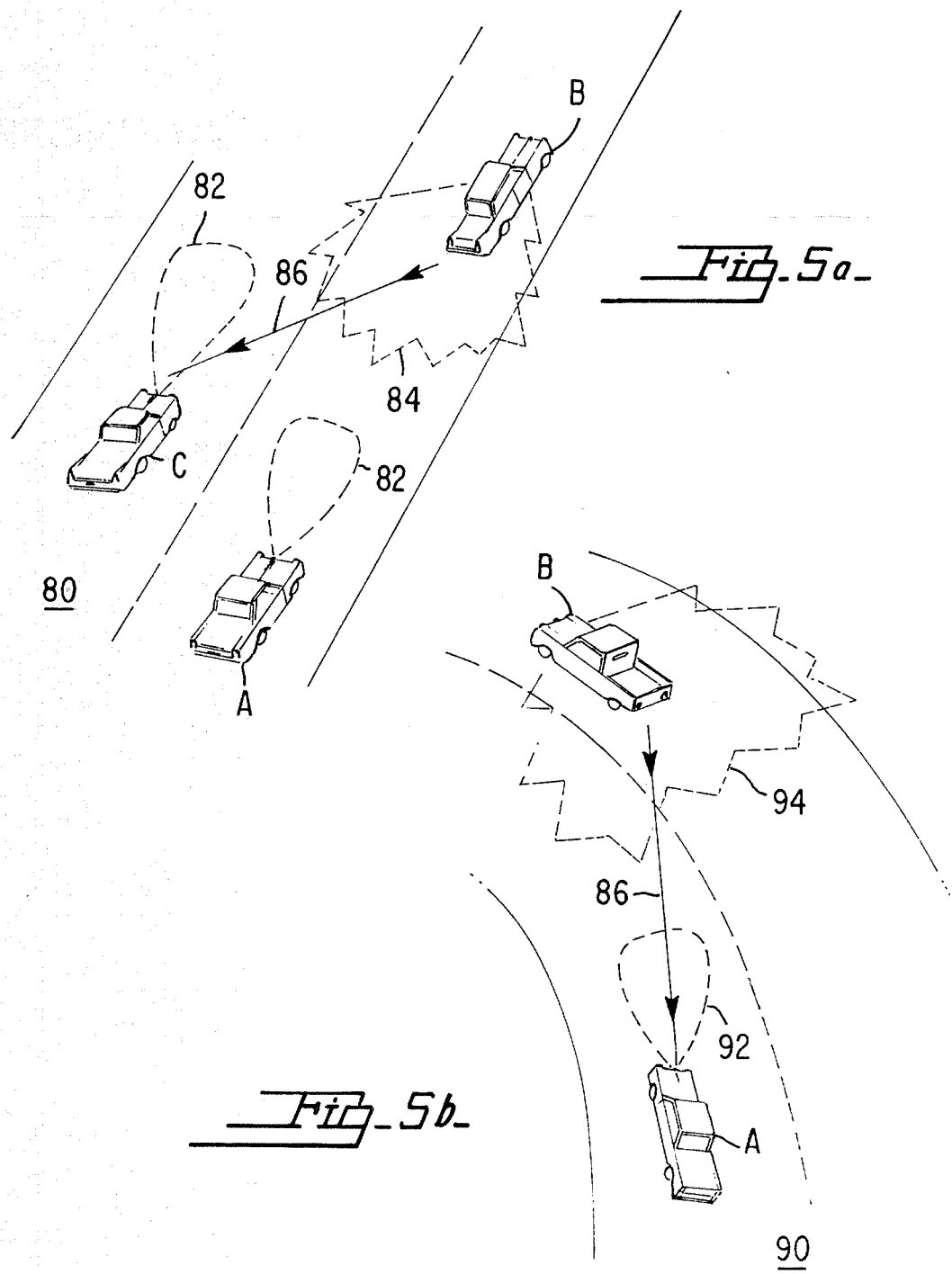

HARMONIC RADAR DETECTING AND RANGING SYSTEM FOR AUTOMOTIVE VEHICLES

BACKGROUND OF THE INVENTION

In conventional radar detecting and ranging systems, the received signal which is reflected by the target exhibits essentially the same frequency as the transmitted signal. In short range detecting and ranging systems, such as automotive collision avoidance systems, this presents a severe problem since any one of a number of possible targets may provide an undesired return signal. For example, automotive radar systems have been proposed which transmit a signal in the electromagnetic frequency spectrum region and detect the return signal at the same fundamental frequency. Since these systems must respond equally well to large and small objects, the transmitter power is typically raised to accomodate the smallest possible target. However, since the radar cross section of a relatively small passenger car and a large truck differ by several orders of magnitude, the radar return from the large vehicle can mask the presence of a small vehicle. Additionally, these proposed systems exhibit two fundamental and critical disadvantages. The first being the presence of "clutter returns" from extraneous targets which may be unobtrusive, fixed objects along a roadway or moving vehicles in non-critical operating relationship to the protected vehicle. The second disadvantage is the "blinding" caused by other radar equipped vehicles operating in proximity to the protected vehicle. This blinding problem is most severe in crowded highway environments where the protection otherwise afforded by collision avoidance radar is most beneficial.

Another problem inherent to these conventional radar detecting and ranging systems occurs when there are two or more targets of equal size (or equal radar cross section) and equal speed. This situation gives rise to a fading condition and under a special condition the radar becomes inoperative. When many targets with various speeds and sizes appear in a radar beam, the detected signal will fluctuate and the output will represent either the speed of one of the targets or the average speed of all of them or a false signal not related to any desired parameter. This problem is generally discussed in Ishii, "Analysis of Target Speed Determination With Doppler Radar", *IEEE Transactions on Instrumentation and Measurement*, Vol. IM–19, No. 2, (May, 1970) p. 86.

Systems have also been suggested which detect a reflected second harmonic of the transmitted fundamental signal rather than the reflected fundamental signal. These suggested systems also provide for the use of passive non-linear elements which are, in turn, deployed as targets, in order to enhance the reflected harmonic signal. However, the blinding problem discussed above with reference to conventional radar systems still remains a problem since the transmitter of other similarly equipped protected vehicles includes sufficient harmonic signal content to create interference, particularly when a plurality of vehicles are operating in close proximity to one another. Additionally, the non-linear front-end characteristics of the harmonic receivers used in these prior art systems may produce enough extraneous second harmonic signal, when illuminated by an undesired fundamental signal, to create false output indications.

The present invention overcomes the disadvantages and problems present in the prior art by providing a harmonic radar detecting and ranging system for automotive vehicles which is relatively immune to blinding and clutter.

SUMMARY OF THE INVENTION

Briefly, the present invention provides a detecting and ranging system for use with an automotive vehicle comprising: a transmitter; a receiver; and output means, and a directional antenna network coupled to the transmitter and the receiver. The transmitter includes means for generating electromagnetic energy signals of a predetermined frequency. The receiver includes means adapted to detect electromagnetic energy signals which are derived from and are harmonically related to the signals of the predetermined frequency. The output means is coupled to the receiver and cooperates with the receiver to produce an output signal in response to the detected signals. The antenna network includes means for selectively transmitting the signals of the predetermined frequency into a given transmission direction while polarizing the transmitted signals into a given polarization direction. The antenna network further include means which are selectively responsive only to electromagnetic signals originating from the given transmission direction, which signals have been derived from and are harmonically related to the transmitted signals, and which have a polarization direction substantially orthogonal to the given polarization direction, for applying the selectively derived signals to the receiver.

BRIEF DESCRIPTION OF THE DRAWING

Many of the attendant advantages of this invention will become more readily appreciated as the same becomes better understood by reference to the following detailed description when taken in conjunction with the accompanying drawing wherein:

FIG. 3 is a pictorial elevation view of a protected automobile utilizing the system of the present invention in a highway environment which includes an example of two preceding vehicles in succession;

FIG. 4 is an illustrative scene view of a four-lane highway including representative examples of vehicles using conventional prior art automotive radar systems;

FIG. 5A is another scene view of conventional prior art radar equipped automotive vehicles in a single-direction, two-lane environment;

FIG. 5B is another scene view of conventional prior art radar equipped vehicles in a single-direction, two-lane highway environment along a curved portion thereof; and FIG. 6 is a schematic representation showing a preferred configuration of the radar detecting and ranging system of the present invention.

DETAILED DESCRIPTION

Figure 1:
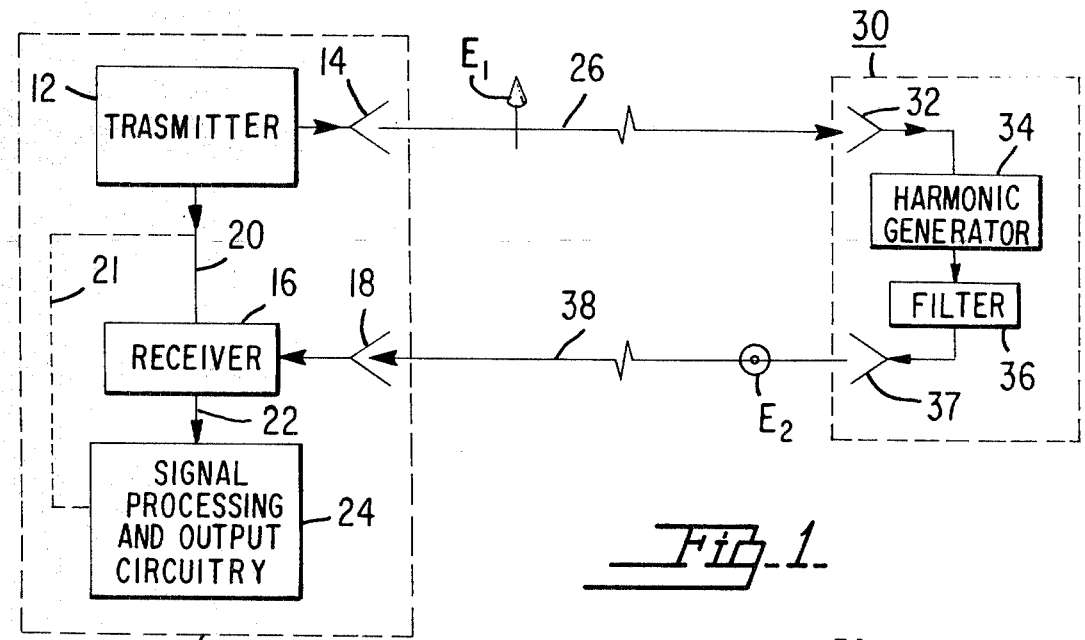
FIG. 1 is a schematic representation showing the detecting and ranging system of the present invention together with a representation of the transmitted and reflected electromagnetic energy relative to a target adapted for use with the system.

Referring now to the drawing there is shown in FIG. 1 a radar detecting and ranging system 10 having a transmitter 12 coupled to a directional transmitting antenna 14. System 10 includes a receiver 16 coupled to a directional receiving antenna 18. Transmitter 12 includes an output 20 which is coupled to receiver 16 for mixing a portion of electromagnetic energy generated by transmitter 12 with the electromagnetic energy received by receiver 16. Receiver 16 includes an output 22 which is coupled to signal processing and output circuitry 24.

Antenna 14 is arranged to direct a polarized beam 26 of electromagnetic energy in a given direction. Antenna 18 is arranged to receive a polarized beam 38 of electromagnetic energy from the given direction. A suitable target 30 for radar system 10 is also shown in FIG. 1. Target 30 preferably includes a directional receiving antenna 32 which is arranged to receive polarized beam 26. The output of antenna 32 is coupled to a harmonic generator 34. Harmonic generator 34 may comprise a passive non-linear element such as, for example, a zero-bias silicon Schottky barrier diode. Accordingly, the output signal of harmonic generator 34 includes components of the fundamental frequency of beam 26 as well as harmonic components of the fundamental frequency signal. The output of harmonic generator 34 is coupled to a suitable filter 36 which substantially filters all but the desired harmonic component. The desired harmonic component is coupled at the output of filter 36 to a directional antenna 37. Antenna 37 is arranged to transmit polarized beam 38 back toward radar system 10. Thus, it can be seen that target 30 comprises a retrodirective type passive reflector which is adapted to reflect harmonic electromagnetic energy, in reponse to being illuminated by the corresponding fundamental frequency electromagnetic energy, back toward the source of the fundamental frequency energy. The polarization of transmitted beam 26 is depicted by arrow $E_1$ which corresponds to the electric-field vector of beam 26. It can be seen that the direction of $E_1$ lies in the plane of the drawing. Similarly, the polarization of reflected beam 38 is depicted by arrow $E_2$ which corresponds to the direction of the electric field of beam 38. It can be seen that the direction of $E_2$ lies in the direction perpendicular to the plane of the drawing. The signal processing and output circuitry 24 of FIG. 1 may include a suitable logic and processing means to compute the desired parameters such as, range and/or range rate between the instantaneous location of system 10 and target 30. In an automotive application, system 10 would be mounted on the forward portion of a protected vehicle and target 30 would be mounted on the rearward portion of the participating preceding vehicles. The respective antennas of system 10 and target 30 may comprise a unitary structure adapted to facilitate mounting on both the protected as well as the participating vehicles.

Figure 2:
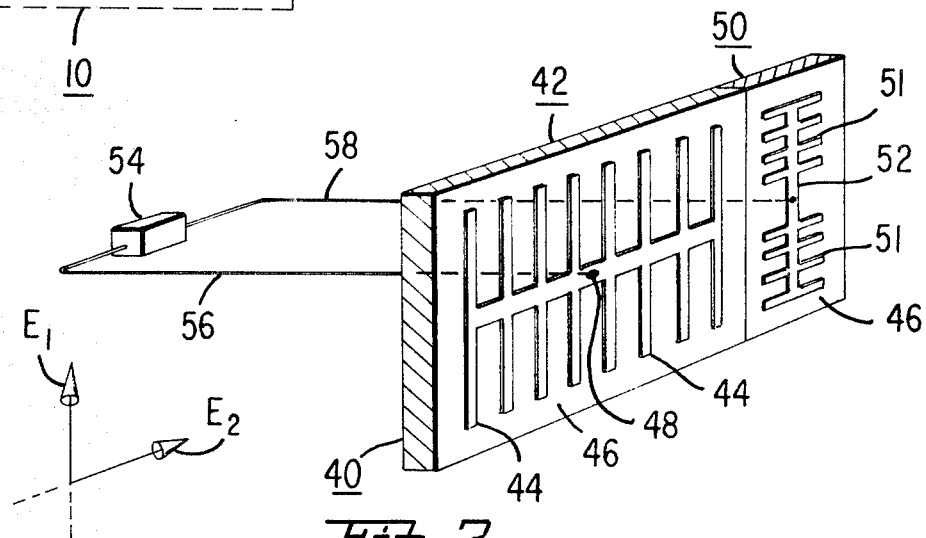
FIG. 2 is a perspective view of a preferred antenna structure adapted for use with the system of FIG. 1.

As shown in FIG. 2, the respective antenna structures may comprise a flat printed-circuit antenna 40. A first portion 42 of antenna 40 may include a plurality of resonant dipole elements 44 formed on the surface of a low-loss dielectric circuit board 46. The dipoles may be coupled to and fed by feedline 48 which also provides a coupling point to this portion of antenna 40. It can be seen that dipole elements 44 are arranged to provide vertical electric-field polarization $E_1$. A second portion 50 of antenna structure 40 may also include an array of resonant dipole elements 51 formed on the same circuit board 46. Dipoles 51 are fed by feedline 52 which also provides a coupling point to this portion of antenna structure 40. It can be seen that dipoles 51 are arranged to provide a horizontal electric-field polarization $E_2$. First portion 42 is coupled to an external circuit 54 by way of transmission line 56. Second portion 50 is coupled to external circuit 54 by way of transmission line 58. Since antenna structure 40 can be utilized as the antenna means for system 10 or target 30 of FIG. 1, external circuit 54 may comprise the remaining components of either system 10 or target 30. It has been found to be practical to operate the system 10 including transmitter 12 in the microwave region such as, for example, at X-band. Accordingly, the receiver 16 is adapted to receive a harmonic of the transmitted frequency such as, for example, the second harmonic which would be found in the Ku-band corresponding to the above-mentioned X-band. The microwave region is preferred for three primary reasons: (i) spectrum availability at these frequencies; (ii) relative freedom from electromagnetic interference (EMI) at these frequencies; and (iii) the realizable antenna gains consistent with small overall antenna size. Flat printed-circuit antennas of the type described in FIG. 2 are described and shown in greater detail in U. S. Pat. No. 3,587,110.

It should now be apparent that a flat printed-circuit antenna such as antenna 40 shown in FIG. 2 can provide a relatively high gain radiating surface embodied in a unitary structure which facilitates mounting in an automotive environment. For example, at the X-band and Ku-band frequencies mentioned above, a flat antenna exhibiting gain on the order of 25 db in both the transmit and receive directions was constructed. The overall size of the unitary structure was approximately 8 in. × 16 in. The thickness was substantially less than one inch.

Further, the isolation provided by the cross-polarization between the respective transmitting and receiving portions was on the order of 25 db. It can be seen that the profile of this unitary antenna structure is similar to that of an ordinary automotive license plate and its overall size is consistent with typical license plate mounting wells. Further, the depth or thickness of this unitary structure avoids the mounting problems commensurate with high gain microwave horn antennas as found in the prior art.

To provide, for example, a maximum effective operating range of 100 yards (300 feet) it has been found desirable that the directivity of the entire antenna system provide a resultant beamwidth on the order of three degrees. Since the average single-lane width of a typical roadway is on the order of 12 to 14 feet, the three degree beamwidth confines the operation of the radar system 10 to a single-lane operation when the maximum operating range is established at 100 yards. In this manner interference from adjacent lanes is avoided. As will be described hereinafter, the dynamic operating characteristics of system 10 can be readily controlled to further confine the operation of system 10 within the above-described parameters.

Referring now to the operation of the system in accordance with the present invention as shown in FIG. 1, it will be assumed that a unitary structure antenna, such as antenna 40 of FIG. 2, is utilized in both system 10 and target 30. The output of transmitter 12 is coupled to the vertically polarized portion of the unitary antenna depicted as antenna 14 in FIG. 1. Accordingly, a vertically polarized beam 26 is transmitted to antenna 32 of target 30 which in turn corresponds to the vertically polarized portion of the unitary antenna of target 30. The output of filter 36, representing the desired harmonic of polarized beam 26, is coupled to antenna 37 which in turn represents the horizontally polarized portion of the unitary antenna of target 30. Accordingly, a horizontally polarized beam 38 is reradiated back toward antenna 18 of system 10, the antenna 18, in turn, representing the horizontally polarized portion of the unitary antenna of system 10. The output of antenna 18 is applied to receiver 16 wherein it is mixed with an appropriate harmonic of a sampled portion of the output signal from transmitter 12 as provided by output 20.

Alternatively, the sampled portion of the output signal from transmitter 12 may be directly mixed with the received harmonic signal wherein the output of receiver 16 is an intermediate frequency signal of a frequency equal to the difference between the received harmonic and the transmitted fundamental. In this case the resulting intermediate frequency can be further detected or processed by output circuitry 24 in conjunction with a second input signal coupled to circuitry 24 which is shown as dotted lead 21' in FIG. 1.

In the preferred system configuration, which is discussed in greater detail hereinafter with reference to FIG. 6, the transmitted signal is frequency-modulated and the instantaneous frequency difference between the received signal and the second harmonic of the transmitted signal is detected to provide distance or range information. That is, the instantaneous frequency of the received signal will differ from the second harmonic of the instantaneous frequency signal being generated at transmitter 12 in accordance with the time delay of the received signal. This configuration has the advantage that the distance to the target is continuously detected regardless of the relative speed between system 10 and target 30. Whereas, a system which solely detects Doppler shift or velocity information stops detecting when the relative velocity between the radar system and the target is zero.

It should now be apparent that an automotive vehicle when equipped with a system in accordance with the present information responds only to a reflected harmonic signal having a given polarization direction. Further, the transmitted output signal from other similarly equipped vehicles will not be detected by the harmonic receiver of the protected vehicle since the transmitted signal of all other protected vehicles is at the fundamental frequency and exhibits on orthogonal polarization. Thus, the blinding problem that would otherwise occur if the radar system were adapted to detect randomly polarized, reflected or return signals at the same frequency as the transmitted signal, is substantially eliminated. Additionally, virtually nothing in nature will provide a reflected second harmonic signal of sufficient level and proper polarization to be detected by the radar system receiver; except, of course, a properly designed retrodirective harmonic reflector.

The system in accordance with the present invention may be used in automotive applications to provide minimum safe following distance or headway control. It has been suggested that safe operation headway between operating vehicles requires one car-length of separation for each ten mile-per-hour increment of vehicle speed. A more sophisticated formula for headway control would include variables such as separation between vehicles, vehicle velocity and vehicle closing rate between the protected and participating vehicle. Accordingly, the distance information between successive vehicles as provided by the system of the present invention can be compared to the ground speed of the vehicle and processed through a relatively simple logic and control means to provide a control which responds to the actual separating distance and functions to actuate a device, such as a warning signal or the brakes of the vehicle, when a dangerous operation or headway condition exists. The preferred form of the present invention, which is discussed in greater detail with reference to FIG. 6, is particularly well suited for this headway control application since the range and range related information is continuously detected.

The present system can also be used in other collision avoidance applications. For example, having detected the range to a retrodirective harmonic reflector target and knowing the velocity of the protected vehicle, the signal and processing circuitry can be used to divide the detected range by the velocity to calculate the time before an imminent collision. In this example, the output circuitry can be used to deploy safety devices, such as inflatable pneumatic crash cushions or the brakes of the vehicle, when the calculated time before an imminent collision falls below a predetermined or critical value. The present invention will find particular utility in this application since the harmonic radar system is selectively responsive only to properly designed and selectively deployed targets.

The present invention provides a highly directive antenna network for use with an automotive radar system which cooperates with a similar antenna network incorporated in selectively deployed targets. By virtue of the cross polarization correspondence between the cooperating antenna networks, a unique combination of directional gain and isolation results. Accordingly, extraneous or non-critical potential targets are virtually invisible to the harmonic radar system of the present invention. The clutter-free operation which results is particularly advantageous where extraneous targets must be ignored. For example, proposed crash cushion deployment systems rely on impact detecting devices which respond to collision situations after contact is made. Consequently, these proposed systems are generally ineffective when the speed at the point of impact exceeds that speed which precludes sufficient time to deploy the safety device. Thus, it would be highly desirable to detect an imminent collision before contact is made in order to allow sufficient time for full deployment of the safety device. An automotive radar system in a collision detection configuration is the logical supplement to impact detecting devices. However, an automotive radar system that is susceptible to blinding and more importantly clutter from extraneous objects, would result in doubtful success. Additionally, certain radar targets, such as, for example, " snap-off" poles, collapsible partitions or portable metal cones may well be undesired targets to a system which would otherwise deploy such safety devices. Herein lies an important advantage of the system in accordance with the present invention; that is, through the selective deployment of properly designed retrodirective harmonic targets, these undesired conventional radar targets may be readily avoided.

Since all participating vehicles present the same radar cross section to the system in accordance with the present invention, the multitarget problem present in the prior art conventional radar systems is virtually eliminated. This advantage is illustrated in FIG. 3 wherein there is shown generally at 60 a pictorial elevation view including a protected vehicle 62 in a typical highway environment. Protected vehicle 62, which includes a graphic illustration of a harmonic radar detecting and ranging system 10, is shown following a participating vehicle 64 which in turn includes a retrodirective harmonic reflector 30. Preceding the relatively small vehicle 64 is substantially larger vehicle 66 which also includes a retrodirective harmonic reflector 30. It can be seen that system 10 on automobile 62 cooperates with the target 30 of vehicle 64. Further, the target 30 of larger vehicle 66 is substantially shielded by smaller vehicle 64. Thus, the multitarget problem of the prior art is effectively avoided.

An example of the blinding problem inherent to the prior art conventional radar systems is shown graphically in FIG. 4. FIG. 4 is a scene view of a four-lane, two-direction highway shown generally at 70. Vehicles A and B are shown travelling in the same lane in a first direction. Vehicles C, D and E are shown travelling in the opposing lanes in a second direction. A highly directional antenna pattern which is associated with each protected vehicle is designated as pattern 72 with accompanying side lobes 74. It can be seen that transmitted vectors designated as vectors 76, 78 and 79 from vehicles C, D and E respectively are directed to the propagation coverage area (pattern 72) of vehicle A. Accordingly, the receiver of the conventional radar system of vehicle A is blinded by the transmitted signals of the oncoming vehicles and is accordingly rendered inoperative with reference to the desired target represented by vehicle B in FIG. 4. Moreover, the extraneous or blinding signal may cause a false output signal. It should be noted that a harmonic radar detecting and ranging system in accordance with the present invention would continue to operate in the presence of the otherwise blinding fundamental frequency signals propagated by vehicles C, D and E. Further, the system of the present invention is relatively immune to the spuriously radiated harmonic signals of oncoming vehicles since the spuriously radiated signals also exhibit the same orthogonal or improper polarization as the transmitted fundamental signal.

An example of the clutter problem inherent to conventional prior art automotive radar systems is illustrated in FIG. 5A wherein there is shown generally at 80 a scene view of a segment of a two-lane, single-direction highway. Vehicles A and B are shown in succession in one lane while vehicle C is shown in the adjacent lane. Vehicles A and C are illustrated in conjunction with their directive antenna patterns designated as 82 in FIG. 5A. The widely scattered radar return from vehicle B is illustrated by pattern 84. It can be seen that the scattered return propagation pattern 84 provided by vehicle B in reponse to being illuminated by the radar signal from vehicle A somewhat resembles an irregular cardiod pattern surrounding vehicle B. As a result of the scattered propagation pattern 84 from vehicle B, return energy is also reflected to he radar receiver of vehicle C which energy is depicted by vector 86 in FIG. 5A. It can be seen that vehicles B and C are operating in a non-critical relationship to one another. It can also be seen that the conventional radar system of vehicle C can respond to the clutter eminating from vehicle B. It should be noted, however, that a harmonic radar detecting and ranging system in accordance with the present invention would be virtually immune to this prior art clutter problem since the radar return provided by participating vehicles would exhibit a well defined directional beam. Further, the radar return provided by a participating vehicle in a radar system employing selectively deployed retrodirective harmonic reflectors would be a well defined directional beam having a pattern somewhat resembling pattern 82 in FIG. 5A. This reflected beam would be substantially confined to the lane common to vehicles A and B and would accordingly propagate in a direction back to vehicle A only.

Another version of the clutter problem inherent to conventional prior art automotive radar systems is illustrated in FIG. 5B. There is shown generally at 90 a segment of a single-direction, two-lane highway along a curved portion thereof. A protected vehicle A with its attendant antenna pattern 92 is shown in the inner lane. A second vehicle B operating in the non-critical adjacent or outer lane is shown in conjunction with its widely scattered return signal designated as pattern 94. Due to the relative positions of the two vehicles, the transmitted radar signal from vehicle A illuminates the rearward portion of vehicle B thereby resulting in the clutter represented by pattern 94. It can be seen that a portion of the reflected energy, represented by vector 86, will be detected by the radar receiver of vehicle A. As noted above, a clutter signal or other extraneous signal, such as that depicted by pattern 94 and vector 86, could act to unnecessarily and prematurely deploy a safety device, such as a crash cushion or cause automatic braking of vehicle A. It should now be apparent that a harmonic detecting and ranging system in accordance with the present invention, operating in cooperation with a retrodirective harmonic reflector deployed on vehicle B in FIG. 5B would be immune to this clutter problem because of the directional characteristics of the passive target.

FIG. 6 illustrates a preferred form of the harmonic radar detecting and ranging system of the present invention. System 100 in FIG. 6 includes a transmitting antenna 102 and a receiving antenna 104. Here again antenna 102 and 104 may form a unitary antenna structure, such as antenna 40 of FIG. 2. System 100 includes a voltage controlled oscillator (V.C.O.) 108 which generates an electromagnetic signal. V.C.O. 108 may comprise a varactor tuned transferred electron oscillator (TEO) device wherein the frequency of oscillation is controlled by an external voltage applied to the varactor. The output signal frequency of V.C.O. 108 is modulated by a sweep oscillator 106. Oscillator 106 provides a linearly varying output voltage, such as a triangular waveform, which is coupled to the varactor input of V.C.O. 108. The frequency modulated output signal of V.C.O. 108 is coupled to an isolator 110 which in turn has its output coupled to low pass filter 112. Filter 112 acts to selectively pass only the desired fundamental frequency signal. The output of low pass filter 112 is coupled to coupler 114 which in turn has its output coupled to isolator 116. The output of isolator 116 is coupled to transmitting antenna 102. A portion of the electromagnetic energy passing through coupler 114 is diverted to frequency doubler 118. Isolators 110 and 116, which may comprise ferrite isolators, provide an improved impedance match between the respective sections of system 100 while providing additional filtering.

Receiving antenna 104 is coupled to an isolator 119. The output of isolator 119 is coupled to high pass filter 120 which in turn has its output coupled to mixer 122. Filter 120 acts to selectively pass only the desired harmonic frequency signal which in this embodiment is the second harmonic. The output of frequency doubler 118 is coupled to mixer 122 by way of high pass filter 123. Filter 123 acts to selectively pass only the second harmonic frequency output from doubler 118. The output of mixer 122 is therefore a signal which represents the frequency difference between the second harmonic output of doubler 118 and the output of filter 120. The output of mixer 122 is coupled to a high pass filter 124 which in turn has its output coupled to amplifier 126. The output of amplifier 126 has its output coupled to low pass filter 128. The output of low pass filter 128 is coupled to signal processing and output circuitry 130. Filters 124 and 128 act to establish the lower and upper limits, respectively, of the difference frequency applied to circuitry 130 to thereby control the dynamic operating or response range of system 100. A ground speed sensor 134 has its output coupled to a second input of circuitry 130. Circuitry 130 provides an output signal on lead 132.

Ground speed sensor 134 may comprise a speedometer cable sensor coupled to the speedometer of the protected vehicle which utilizes system 100. Ground speed sensor 130 may alternatively comprise separate Doppler radar system which operates in a well-known manner.

Referring now to the operation of system 100, it will be understood that system 100 is adapted for use with an automotive vehicle in concert with a retrodirective harmonic reflector which provides a cooperating target. The target being disposed within a given distance from the vehicle and in the direction of forward movement of the vehicle. Transmitting antenna 102 radiates the frequency-modulated electromagnetic signal toward the target and in a given polarization direction. The target, in response to being illuminated by the frequency modulated fundamental signal of proper polarization, reradiates an orthogonally polarized second harmonic signal back toward orthogonally polarized receiving antenna 104 of system 100. The received signal at antenna 104 will be delayed with respect to the corresponding transmitted signal at antenna 102 as a function of the distance between system 100 and the target. During this delay period the output signal frequency of V.C.O. 108 will continue to vary in accordance with the varying output voltage from oscillator 106; however, the instantaneous frequency of the received signal will be the second harmonic frequency of the transmitted signal at the start of the delay period. Therefore, the instantaneous frequency of the output signal from mixer 122 which mixes the received second harmonic with a frequency doubled sample of the transmitted signal, will be a function of th distance or range to the target. Accordingly, the signal processing and output circuitry 130, which may include a counter or other suitable frequency detecting means, can provide an output signal which may be readily calibrated in terms of distance to the target. If, for example, circuitry 130 provides a voltage output signal, the output signal may also be differentiated by conventional circuit means to provide a second signal which represents the rate of change of distance or range rate.

It should be noted that the dynamic operating range of system 100 can readily be controlled by selecting the desired parameters for filters 124 and 128. In this manner only those reflected signals originating within a given range are presented to the signal processing and output circuitry. This feature may be used to complement and further facilitate the antenna network design so as to eliminate adjacent lane interference.

As previously discussed, circuitry 130 may include appropriate means to compare the detected range to the ground speed of the vehicle in order to provide the vehicle operator with an indication that a minimum safe following distance or proper headway is or is not being maintained.

An advantage of the type of harmonic radar system shown in FIG. 6 is that the distance or range between system 100 and the target is continuously detected notwithstanding the relative velocity between the protected vehicle and the target. However, given any particular system configuration, it has been found that successful system operation in view of the blinding and clutter problems of the prior art, necessitates directional antenna gain, proper isolation and particularly orthogonal polarization, in accordance with the teachings of the present invention.

Thus, there is provided in accordance with the present invention a highly effective automotive harmonic radar system facilitating, notably, headway control and collision avoidance. Further, in the event of an otherwise unavoidable collision, the present invention can provide effective pre-collision deployment of safety devices such as, for example, to inflate a pneumatic crash cushion.

What is claimed is:

1. A detecting and ranging system for use with an automotive vehicle, comprising a transmitter, a receiver, an output means and a directional antenna network coupled to said transmitter and said receiver;
    said transmitter comprising means for generating electromagnetic energy signals of a predetermined frequency;
    said receiver comprising means adapted to detect electromagnetic energy signals which are derived from and harmonically related to said signals of said predetermined frequency;
    said output means being coupled to said receiver and cooperating with said receiver for producing an output signal in response to said detected signals; and
    said antenna network including means for selectively transmitting said signals of said predetermined frequency into a given transmission direction while polarizing said transmitted signals into a given polarization direction, said antenna network further including means selectively responsive only to electromagnetic signals originating from said given transmission direction, which signals have been derived from and are harmonically related to said transmitted signals and which have a polarization direction substantially orthogonal to said given polarization direction, for applying said selectively derived signals to said receiver.

2. The system according to claim 1 wherein said receiver includes means coupled to said transmitter wherein said output signal is proportional to the difference in frequency between a preselected harmonic of said predetermined frequency and said selectively derived signals.

3. The system according to claim 1, wherein said output means includes means coupled to said transmitter wherein said output signal is derived by comparing said predetermined frequency signal and said selectively derived signals.

4. The system according to claim 2, including frequency modulation means coupled to said transmitter to vary the frequency of the signals generated by said transmitter about said predetermined frequency.

5. The system according to claim 1, wherein the frequency of said selectively derived signals is the second harmonic of said predetermined frequency 6. The system according to claim 5, wherein said antenna network comprises a unitary antenna structure and wherein said means for selectively transmitting said signals of said predetermined frequency includes a first array of dipole elements having a resonant frequency substantially equal to said predetermined frequency and a polarization direction determinative of said given polarization direction, and wherein the selectively responsive means includes a second array of dipole elements having a resonant frequency substantially equal to the second harmonic of said predetermined frequency and a polarization direction orthogonal to said given polarization direction.

7. A detecting and ranging system for use with an automotive vehicle, comprising a transmitter, a receiver, an output means and a directional antenna network coupled to said transmitter and said receiver;
    said transmitter comprising means for generating electromagnetic energy signals of a predetermined frequency;
    said receiver comprising means adapted to detect electromagnetic energy signals which are derived from and harmonically related to said signals of said predetermined frequency;
    said output means being coupled to said receiver and cooperating with said receiver for producing an output signal in response to said detected signals; and
    said antenna network including means for selectively transmitting said signals of said predetermined frequency in the direction of forward movement of the vehicle and onto a target comprised of a retrodirective harmonic reflector mounted on the rearward portion of a preceding vehicle, while polarizing said transmitted signals into a given polarization direction, said antenna network further including means selectively responsive only to the reflected electromagnetic energy signals which are harmonically related to said transmitted signals and have a polarization direction substantially orthogonal to said given polarization direction for applying said harmonically related and orthogonal signals to said receiver.

8. The system according to claim 7, wherein said retrodirective harmonic reflector includes a harmonic generating means coupled between a first and second directive antenna, said first antenna having a polarization direction corresponding to said given direction and a resonant frequency substantially equal to said predetermined frequency, said second antenna having a polarization direction which is substantially orthogonal to the polarization direction of said first antenna and a resonant frequency substantially equal to a preselected harmonic frequency of said predetermined frequency.

9. The system according to claim 8, wherein said preselected harmonic frequency is the second harmonic of said predetermined frequency.

10. The system according to claim 8 wherein said harmonic generating means comprises a diode.

11. The system according to claim 7, including frequency modulation means coupled to said transmitter to vary the frequency of the signals generated by said transmitter about said predetermined frequency; and
    wherein said receiver includes means coupled to said transmitter to provide an output signal which is proportional to the difference in frequency between a preselected harmonic frequency of said predetermined frequency and said selectively derived signals.

* * * * *